US005488969A

United States Patent [19]

King et al.

[11] Patent Number: 5,488,969
[45] Date of Patent: Feb. 6, 1996

[54] METERING VALVE

[75] Inventors: Steven R. King, Fort Worth; James J. Cole, San Antonio; Kennon H. Guglielmo, San Antonio; John P. Latusek, San Antonio, all of Tex.

[73] Assignee: Gas Research Institute, Chicago, Ill.

[21] Appl. No.: 335,117

[22] Filed: Nov. 4, 1994

[51] Int. Cl.$^6$ .................................................. G05D 7/06
[52] U.S. Cl. .............................. 137/8; 137/468; 137/486; 137/487.5; 251/208
[58] Field of Search ................................ 137/8, 468, 486, 137/487.5; 251/208

[56]         References Cited

U.S. PATENT DOCUMENTS

| | | |
|---|---|---|
| 2,133,580 | 10/1938 | Searle . |
| 3,092,142 | 6/1963 | Willson ................................. 251/208 |
| 3,314,643 | 4/1967 | Sachnik . |
| 4,026,321 | 5/1977 | Kahoe et al. . |
| 4,608,820 | 9/1986 | White et al. . |
| 4,637,420 | 1/1987 | Dyer . |
| 4,685,331 | 8/1987 | Renken et al. . |
| 4,796,651 | 1/1989 | Ginn ........................................... 137/8 |
| 5,029,470 | 7/1991 | Gamperl . |
| 5,062,446 | 11/1991 | Anderson . |
| 5,099,867 | 3/1992 | Emery . |
| 5,108,075 | 4/1992 | Downard et al. . |
| 5,143,116 | 9/1992 | Skoglund . |
| 5,146,941 | 9/1992 | Statler ........................................ 137/8 |
| 5,152,309 | 10/1992 | Twerdochlib ............................ 137/8 |
| 5,251,148 | 10/1993 | Haines et al. . |
| 5,388,607 | 2/1995 | Ramaker et al. . |

FOREIGN PATENT DOCUMENTS 21477 of 1912 United Kingdom .
649020 1/1951 United Kingdom .

OTHER PUBLICATIONS

South Bend Controls Inc., "Metering Valve," Technical Bull. PV–208, 1987 (2 pages).

*Primary Examiner*—Robert G. Nilson
*Attorney, Agent, or Firm*—Speckman, Pauley & Fejer

[57]         ABSTRACT

A method and a metering valve for metering a fluid by incrementally adjusting a position of a flow control element that directly varies a flow area of a flow port opening in a valve housing. The flow control element is adjustably mounted with respect to the valve housing. The metering valve maintains an approximately constant percentage variation of a mass flow rate of a fluid with respect to the current total flow rate flowing through the flow port opening, for each incremental adjustment of the flow control element position, throughout the metering range of the metering valve yielding an exponentially varying mass flow rate as a result of linearly varying the flow control element position.

17 Claims, 4 Drawing Sheets

5,488,969

METERING VALVE

BACKGROUND OF THE INVENTION

1. Field of the Invention

This invention relates to a method and a valve apparatus for metering fluids by incrementally adjusting a position of a flow control element. A percentage variation of a mass flow rate of a fluid with respect to the current mass flow rate, flowing through a metering valve, is maintained approximately constant with respect to a variation in position of the flow control element throughout a metering range of the metering valve.

2. Description of Prior Art

Some conventional valves meter fluids by adjusting the position of a flow control element. For example, Willson, U.S. Pat. No. 3,092,142 teaches a gas cock with a valve body which has a port. A cam disk is rotatably mounted with respect to the valve body. The cam disk has a shape which allows a fluid flow rate through the port to be proportional to the angular position of the cam disk. The fluid flow rate varies linearly as the cam disk is rotated and thus each incremental adjustment of the cam disk varies the flow rate by an approximately constant percentage of a maximum flow rate of the gas cock. However, the percentage variation of the fluid flow rate with respect to the current total flow rate cannot be maintained constant throughout the range of the gas cock.

Dyer, U.S. Pat. No. 4,637,420, discloses a rotary metering valve having a pair of windows in mutual registry with one another which define a flow passage through the valve. Fluid flow through the valve can be adjusted by controlling a relative position of the windows with respect to one another. One window is formed in a metering element baseplate and the other window is formed in a valve body. An outer edge portion of the metering element window has a decreasing radius with respect to the axis of rotation of the metering element baseplate. The metering element baseplate progressively closes a flow passage defined by the two windows, in a radially inward direction as the metering element is rotated. This urges contaminants trapped between the two windows radially inward with respect to the valve, thereby enhancing the effectiveness of a valve actuator in breaking apart contaminants for subsequent removal as fluid continues to flow through the valve.

Skoglund, U.S. Pat. No. 5,143,116 teaches a valve for regulating fluid flow. A control plate is connected to an end of a shaft and is housed within a cavity. An opening in the control plate is sized and shaped to vary the effective flow cross sectional area of a throttle opening in a valve body as the shaft is rotated. The control plate can be sized to provide either a linear or non-linear flow rate change per degree of rotation of the control plate. The Skoglund patent does not teach or suggest maintaining an approximately constant percentage variation of the flow rate, with respect to the current total flow rate, for each degree of rotation of the control plate.

A metering valve which maintains an approximately constant percentage variation of a mass flow rate of fluid flowing through the metering valve for each incremental adjustment of a flow control element position has many advantages. Because each incremental adjustment of the flow control element produces an approximately constant percentage variation of the instantaneous mass flow rate regardless of the position of the flow control element, the ratio of the maximum mass flow rate of the metering valve to the minimum change in mass flow rate that the metering valve can accurately effect throughout a metering range of the metering valve is higher than in conventional valves that operate in a linear fashion.

SUMMARY OF THE INVENTION

Accordingly, it is one object of this invention to provide a method and a metering valve for metering a fluid by maintaining an approximately constant percentage variation between a current fluid flow rate and a previous fluid flow rate for each incremental adjustment of a flow control element position, throughout an entire metering range of a metering valve, which preferably yields an exponential relationship between the flow rate and a flow control element position.

It is another object of this invention to provide a method and a metering valve for metering a fluid which provides a near optimum mass flow turndown ratio, defined as a high ratio of the maximum mass flow rate of the metering valve to the minimum change in mass flow rate that the metering valve can accurately effect throughout the entire metering range of the metering valve.

These and other objects of this invention are achieved by a method and a metering valve for metering a fluid in which a flow control element is adjustably mounted with respect to a valve housing of the metering valve. A position of the flow control element can be incrementally adjusted to vary a flow area of a flow port formed by the valve housing. The metering valve according to this invention maintains an approximately constant percentage variation of a mass flow rate with respect to the instantaneous mass flow rate of the fluid flowing through the flow port for each incremental adjustment of the flow control element position, throughout the entire metering range of the metering valve.

The method and the metering valve of this invention is particularly well-suited for metering low pressure natural gas to gas engines where high pressure natural gas is not available. However, it is apparent that such method and metering valve may also be used to meter other fluids in other applications.

BRIEF DESCRIPTION OF THE DRAWINGS

The above-mentioned and other features of this invention and the manner of obtaining them will become more apparent, and this invention itself will be better understood by reference to the following description of the specific embodiments of this invention taken in conjunction with the accompanying drawings wherein.

DESCRIPTION OF PREFERRED EMBODIMENTS

Figure 2:
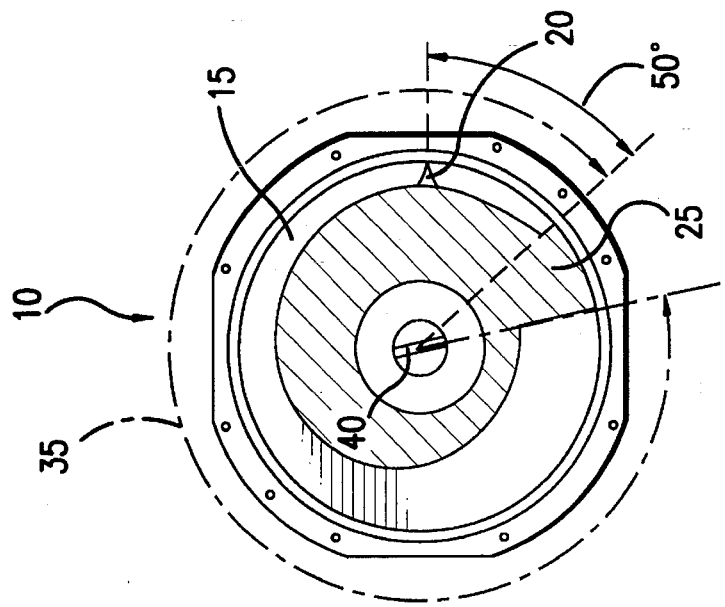
FIG. 2 is a front view of the metering valve shown in FIG. 1, in a partially open position in which the scroll plate has been rotated approximately 50° with respect to the closed position.
Figure 3:
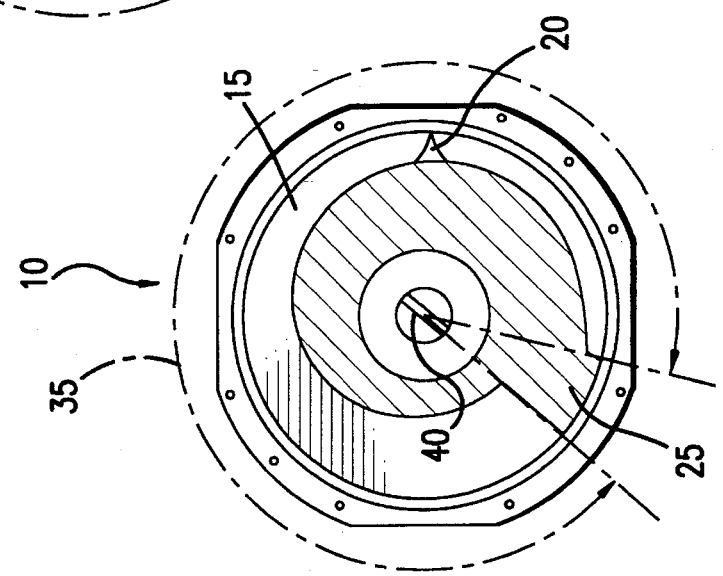
FIG. 3 is a front view of the metering valve shown in FIG. 1, in a partially open position in which the scroll plate has been rotated approximately 100° with respect to the closed position.

FIGS. 1–6 show metering valve 10 comprising valve housing 15 which preferably forms flow port 20. A flow control element is adjustably mounted with respect to valve housing 15 and as the flow control element is moved with respect to valve housing 15 it varies a flow area of flow port 20. According to one preferred embodiment of this invention, the flow control element comprises scroll plate 25, which is shown crosshatched in FIGS. 1–6 for clear identification. Scroll plate 25 is rotatably mounted with respect to valve housing 15 in any suitable manner known to those skilled in the art. A radius of scroll plate 25 continuously decreases with respect to an axis of rotation of scroll plate 25, along metering section 35 of periphery 30 of scroll plate 25. Flow port 20 converges, preferably at a continuously decreasing rate, such as exponentially, in a radial direction away from the axis of rotation of scroll plate 25. Although FIGS. 1–6 show flow port 20 converging throughout the full radial length of flow port 20, it is apparent that the opening of flow port 20 may converge for only a portion of such radial length. The shape of flow port 20 can vary depending upon the particular flow parameters desired throughout the range of metering valve 10. Scroll plate 25 is positioned with respect to flow port 20 in such a way that scroll plate 25 limits an area of flow port 20 by blocking or interfering with the portion of flow port 20 which is between metering section 35 of periphery 30 of scroll plate 25 and the axis of rotation of scroll plate 25.

Figure 1:
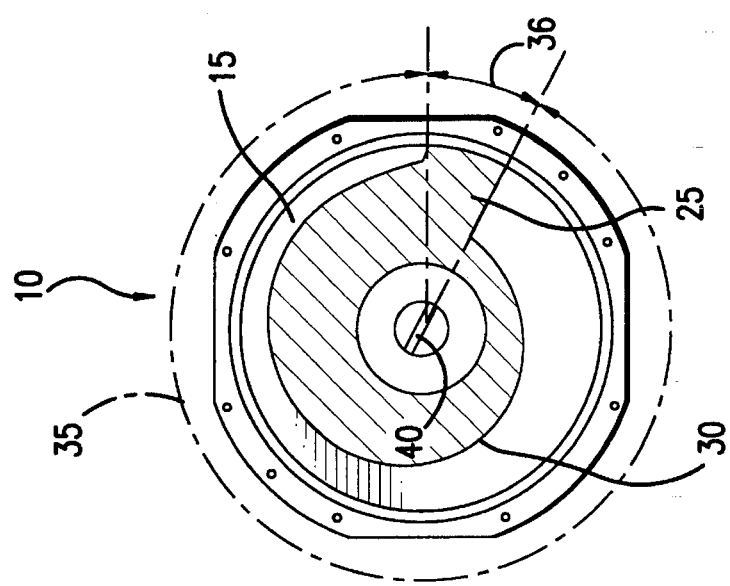
FIG. 1 is a front view of a metering valve showing a scroll plate in a closed position, according to one preferred embodiment of this invention.
Figure 5:
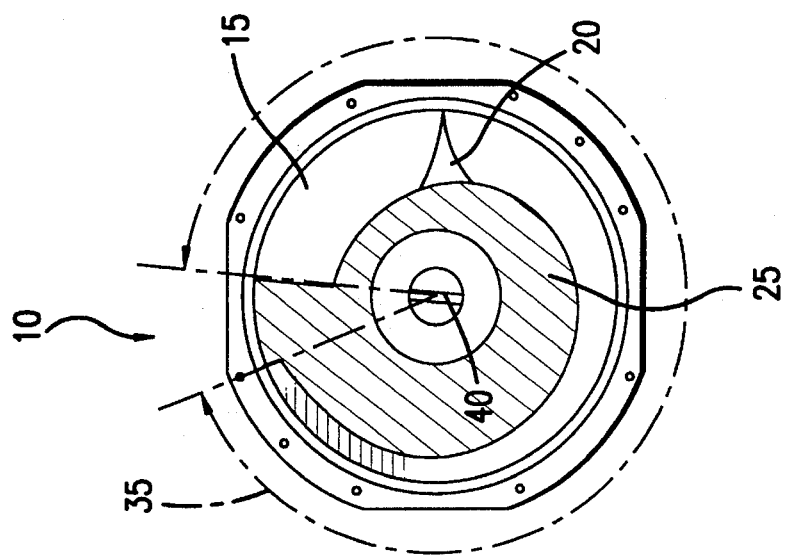
FIG. 5 is a front view of the metering valve shown in FIG. 1, in a partially open position in which the scroll plate has been rotated approximately 250° with respect to the closed position.

The minimum and maximum radii of periphery 30 along metering section 35 and the variation therebetween are factors that affect the metering range of metering valve 10. Likewise, the percent variation of mass flow rate of fluid passing through flow port 20 per degree of rotation of scroll plate 25 is determined by the rate of change of the radius of scroll plate 25 along metering section 35. According to one preferred embodiment of this invention as shown in FIGS. 1–6, metering section 35 which is represented by the dashed line that extends over an approximately 300° arc segment of periphery 30. In a completely closed position of metering valve 10, as shown in FIG. 1, non-metering section 36 of scroll plate 25 completely blocks or interferes with flow port 20 so that the mass flow rate of fluid flowing through flow port 20 is zero or is negligible.

Figure 6:
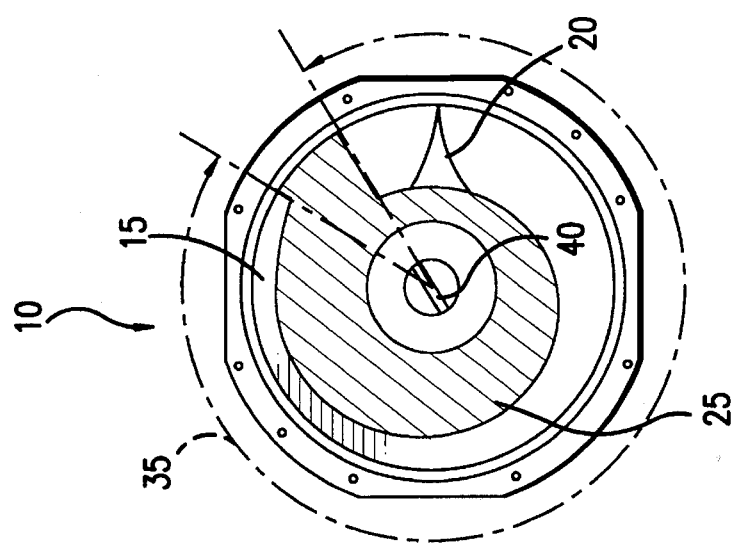
FIG. 6 is a front view of the metering valve shown in FIG. 1, in a fully open position in which the scroll plate has been rotated approximately 300° with respect to the closed position.
Figure 4:
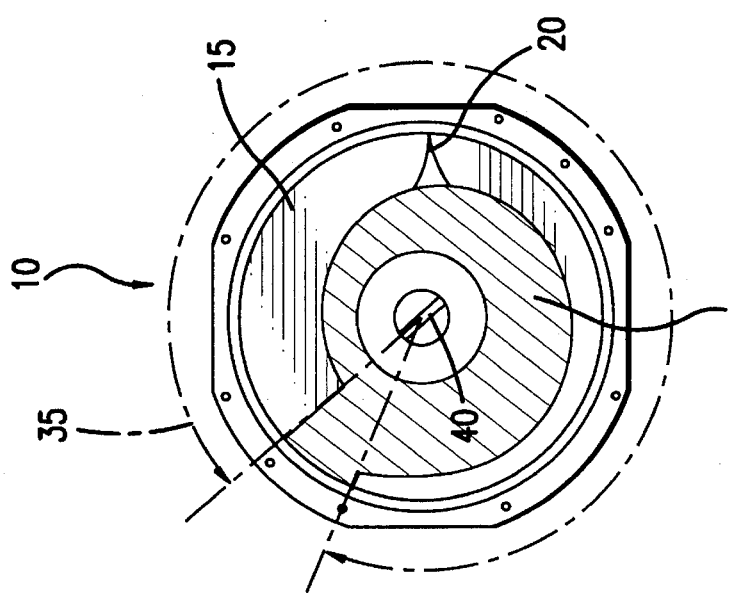
FIG. 4 is a front view of the metering valve shown in FIG. 1, in a partially open position in which the scroll plate has been rotated approximately 200° with respect to the closed position.

FIGS. 2–5 show metering valve 10 in partially open positions with scroll plate 25 rotated by approximately 50°, approximately 100°, approximately 200°, approximately 250° and approximately 300°, respectively. As shown in FIGS. 2–5, scroll plate 25 blocks an area of flow port 20 which is between metering section 35 of periphery 30 and the axis of rotation of scroll plate 25. In a fully open position of metering valve 10, as shown in FIG. 6, scroll plate 25 is rotated by approximately 300° and no portion of scroll plate 25 blocks or interferes with the area of flow port 20.

The shape of flow port 20 and scroll plate 25, and the manner in which scroll plate 25 is mounted with respect to valve housing 15 allows metering valve 10 to maintain an approximately constant percentage variation between increments of a mass flow rate of fluid flowing through flow port 20 for each incremental angular adjustment of scroll plate 25 with respect to valve housing 15. The rate of change of the area of flow port 20 in a radial direction away from the axis of rotation of scroll plate 25 provides a near optimum mass flow turndown ratio, as a function of scroll plate 25 angular position. The turndown ratio is defined as the maximum mass flow rate of metering valve 10 over the minimum change in mass flow rate that metering valve 10 can accurately achieve throughout the metering range of metering valve 10. The turndown ratio of metering valve 10 according to this invention is higher than the turndown ratios of conventional linear valves.

It is apparent that results achieved with scroll plate 25 as the flow control element may also be achieved with flow control elements and flow port openings having different shapes as well. Thus, according to one preferred embodiment of this invention, which is not shown in the drawings, a generally cone-shaped flow control element or plug with an exponentially shaped exterior profile can be positioned within a valve housing opening which forms a corresponding port in order to achieve flow parameters similar to those associated with scroll plate 25 and flow port 20. The mass flow rate of fluid flowing through such valve housing opening or port can be varied by incrementally adjusting an axial position of the cone-shaped flow control element with respect to the corresponding port in the valve housing. Other suitably shaped valve plugs and ports can be used to accomplish the same results.

Metering valve 10 of this invention can be designed so that the percent variation in mass flow rate from one increment of rotation of scroll plate 25 to the next differential increment is constant throughout the full range of travel of scroll plate 25. Thus, regardless of the set point, or flow rate, at which metering valve 10 currently operates, rotating scroll plate 25 a relatively small increment will change the flow rate a fixed percentage from the set point flow rate, or in other words from the previous flow rate prior to the latest angular increment of scroll plate 25.

Each incremental change in rotation of scroll plate 25 changes the flow rate a fixed percentage of the previous flow rate, regardless of the position of scroll plate 25. Thus, rotating scroll plate 25 from the minimum flow rate position an additional 1°, for example, will cause a percentage change in flow rate approximately equal to the percentage change in flow rate that would occur by rotating scroll plate 25 1° from the maximum flow rate position.

Metering valve 10 according to this invention operates differently than conventional valves that have a linear relationship where there is a constant percent variation of the maximum flow rate of the valve per degree of angular rotation. With metering valve 10 according to this invention, there is an exponential variation in the set point flow rate of metering valve 10 per degree of angular rotation of scroll plate 25.

Figure 7:
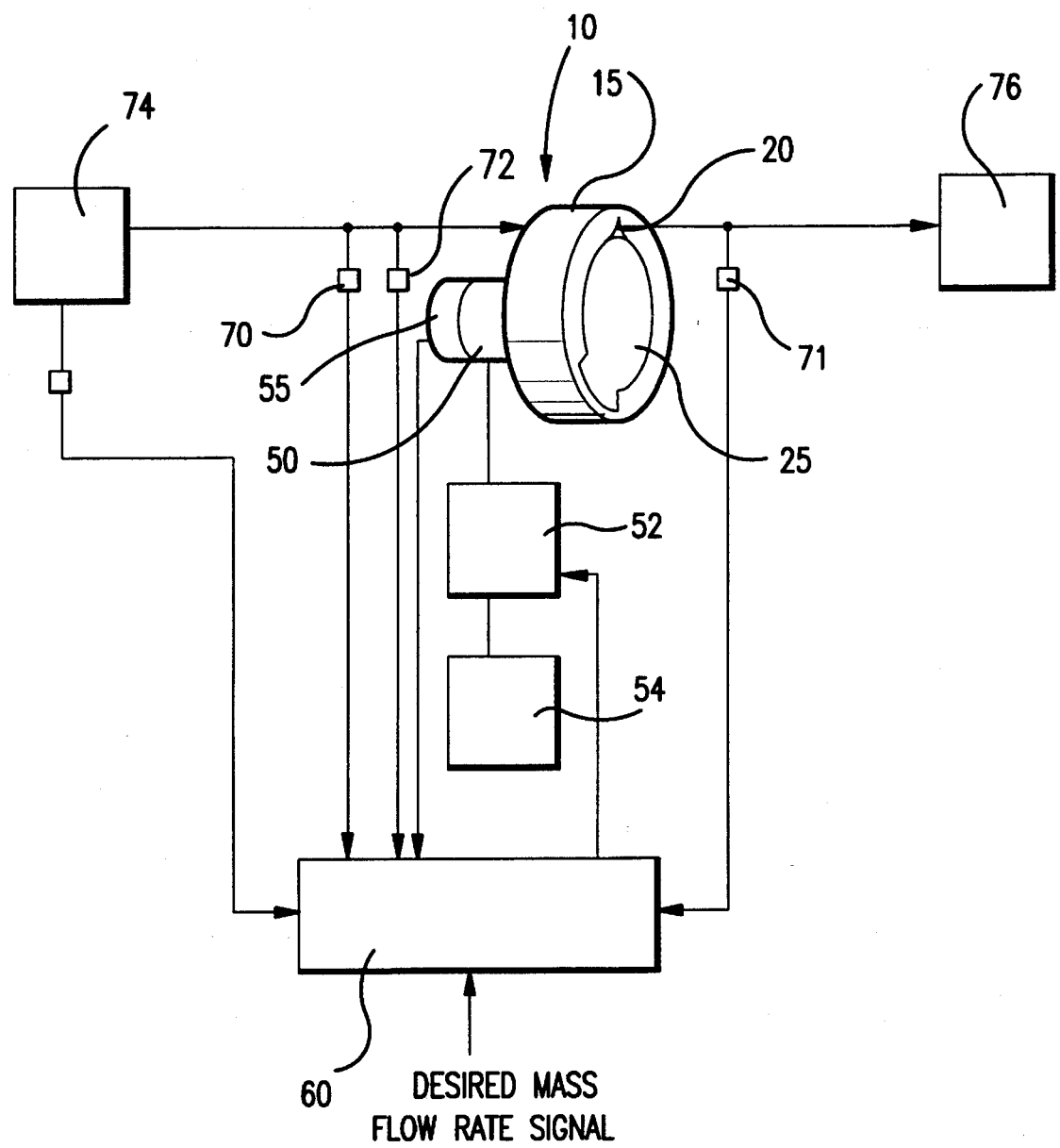
FIG. 7 is a schematic view of a metering valve having a control system including a motor with an integral encoder, a motor controller, temperature and pressure sensors, and a microprocessor, according to one preferred embodiment of this invention.

Metering valve 10, according to this invention, may further comprise adjustment means for incrementally adjusting a position of the flow control element and varying the area of flow port 20. As shown in FIGS. 1–6, the adjustment means comprise a shaft attached to scroll plate 25 having adjustment slot 40 into which an appropriate tool or fitting may be inserted and manually or automatically rotated to adjust an angular position of scroll plate 25. Preferably, actuating means, such as motor 50 with integral encoder 55 for changing and sensing the angular position of scroll plate 25, are operatively coupled to scroll plate 25, as shown in FIG. 7.

In another preferred embodiment according to this invention, metering valve 10 comprises control means for controlling the actuating means as a function of a motion command signal. As shown in FIG. 7, the control means may comprise motor controller 52 electrically connected to motor 50 and electric power source 54. Measurement means, preferably comprising pressure sensors 70 and 71 and temperature sensor 72, can measure an inlet pressure, an outlet pressure and an inlet temperature, respectively, of a fluid such as natural gas flowing through metering valve 10. It is apparent that, according to another preferred embodiment of this invention, hot wire anemometry preferably at a position downstream with respect to metering valve 10 can be used in lieu of pressure sensors 70 and 71 and temperature sensor 72, to determine desired flow conditions. It is also apparent that the mass flow of fluid passing through metering valve 10 can also be measured directly using other measuring devices known to those skilled in the art.

According to one preferred embodiment of this invention, microprocessor 60 computes the motion command signal as a function of a desired mass flow rate of natural gas delivered from gas supply 74 to natural gas engine 76, the measured inlet pressure upstream of metering valve 10, the measured outlet pressure downstream of metering valve 10, and the measured inlet temperature upstream of metering valve 10, all of a fluid such as natural gas flowing through flow port 20 of metering valve 10. Accordingly, as shown in FIG. 7, pressure sensors 70 and 71 and temperature sensor 72 are electrically connected to microprocessor 60 and provide microprocessor 60 with temperature and pressure data. A serial or parallel digital signal may provide microprocessor 60 with a desired mass flow rate value and it is apparent that metering valve 10 may be adapted to meter a mass flow of a fluid according to a commanded analog voltage, analog current, or pulse width modulated input signal. As shown in FIG. 7, encoder 55 may be electrically connected to microprocessor 60, to provide microprocessor 60 with a scroll plate angular position signal. Furthermore, microprocessor 60, which can be provided with speed and load signals from natural gas engine 74, may compute the motion command signal as a function of the speed and/or the load of natural gas engine 74.

Because metering valve 10 maintains an approximately constant percentage variation of the instantaneous mass flow rate for each incremental adjustment of the flow control element position, the mass flow rate of fluid flowing through metering valve 10 can be approximated by the following exponential function:

$$\dot{m} = f(P_{inlet}, P_{outlet}, T_{inlet})^x \qquad \text{Equation 1}$$

where:
$\dot{m}$ = mass flow rate
$P_{inlet}$ = upstream pressure
$P_{outlet}$ = downstream pressure
$T_{inlet}$ = upstream temperature
X = scroll angle (0° to 300°)

Figure 8:
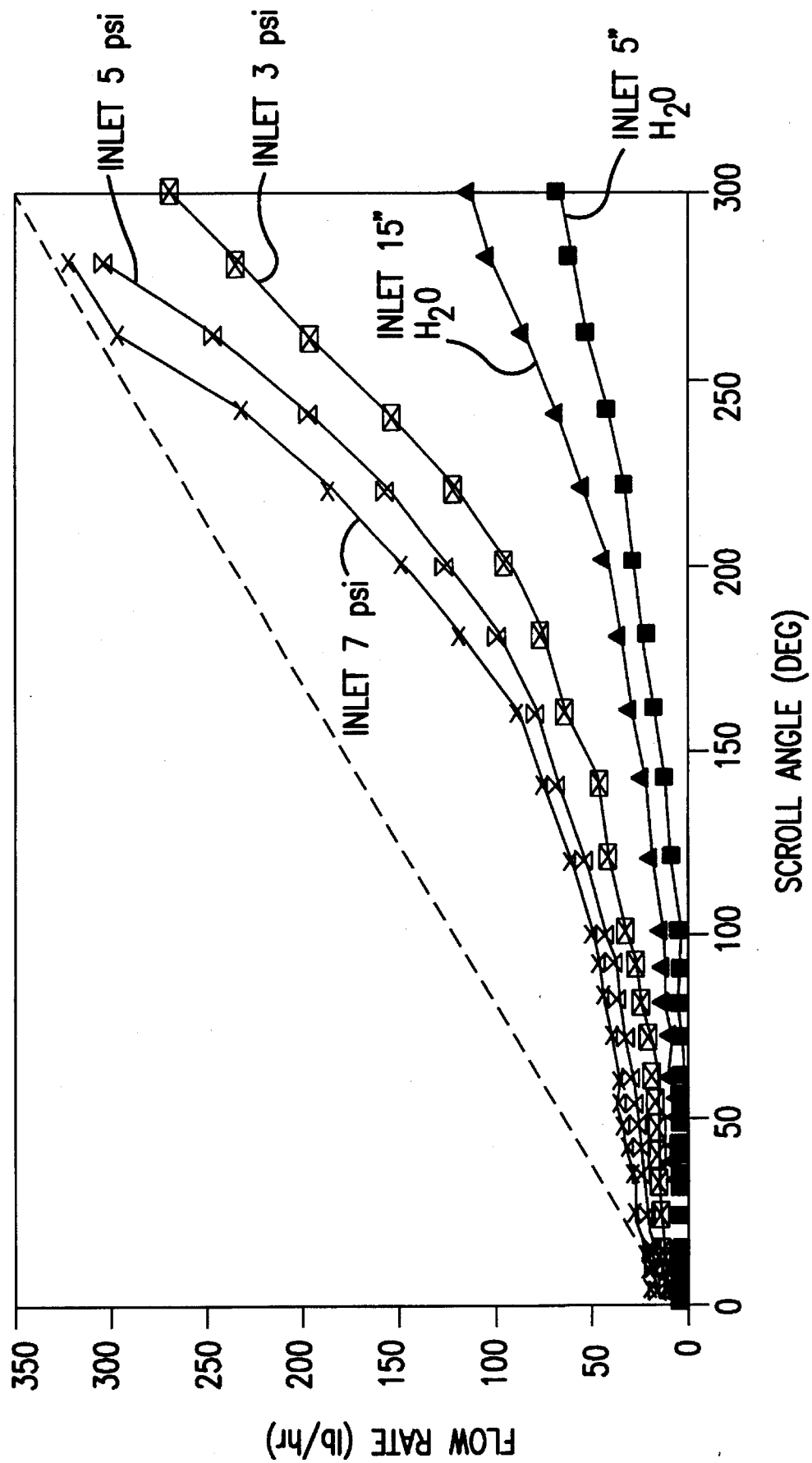
FIG. 8 is a graph showing performance curves of a metering valve according to one preferred embodiment of this invention and a performance curve of a conventional linear valve.

Experimental data indicates that such function f has a value from approximately 1.010 to approximately 1.020 so that the mass flow rate has a value of approximately 1 $lb_m$/hr for a scroll plate scroll angle of 0°. Such experimental data is illustrated by the performance curves for five different metering valve inlet pressures which are shown in FIG. 8. Each of the five curves plots the mass flow rate (lb/hr) of fluid flowing through metering valve 10 throughout its metering range, at an approximately constant upstream pressure. In direct contrast to the straight diagonal dotted line which represents the linear performance curve of a conventional valve, the performance curves of metering valve 10 according to this invention are exponentially shaped, whereby the mass flow rate varies by an approximately constant percentage of set point for each degree of scroll plate rotation.

According to one preferred embodiment of this invention, in response to a desired mass flow rate signal, microprocessor 60 computes a scroll plate scroll angle for achieving the desired mass flow rate according to the following mass flow equation for unchoked subcritical flow:

$$\dot{m} = A_v P_u C_D (K/RT_u)^{1/2} * (P_d/P_u)^{(k-1)/2k} * (2/(k-1)) * [(P_u/P_d)^{(k-1)/k} - 1]^{1/2}$$

where:
$\dot{m}$ = mass flow rate
$A_v$ = flow area
$P_u$ = upstream absolute pressure
$P_d$ = downstream absolute pressure
$C_D$ = discharge coefficient
k = ratio of specific heats = $C_p/C_v$
R = molar gas constant
$T_u$ = upstream absolute temperature Microprocessor 60 may refer to look-up tables to determine the area of flow port 20 as a function of the scroll angle of scroll plate 25, and the discharge coefficient as a function of the scroll angle of scroll plate 25 and the metering valve inlet pressure.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention. As an example, a barrel value arrangement can be substituted for the scroll design to effect the exponential flow versus rotation angle performance.

We claim:

1. A metering valve comprising:

a valve housing, said valve housing forming a flow port;

a flow control element adjustably mounted to move with respect to said valve housing;

adjustment means for incrementally adjusting a position of said flow control element and varying a flow area of said flow port; and flow control means for maintaining at each fixed incremental position of said flow control element an approximately constant percentage of set point variation in mass flow rate of a fluid flowing through said flow port throughout a metering range of said metering valve, said constant percentage of set point variation being a difference between an incremented mass flow rate at an incremented position of said flow control element and a set mass flow rate at a set point previous to said incremented position, divided by said set mass flow rate.

2. A metering valve according to claim 1, further comprising:

measurement means for measuring an inlet pressure, an outlet pressure, and an inlet temperature of said fluid flowing through said metering valve;

microprocessor means for computing a motion command signal as a function of a desired mass flow rate, said measured inlet pressure, said measured outlet pressure, and said measured inlet temperature; and said microprocessor means emitting said motion command signal to said adjustment means, and said adjustment means incrementally adjusting said position of said flow control element as a function of said motion command signal.

3. A metering valve according to claim 1, further comprising:

measurement means for measuring at least one flow condition of said fluid downstream with respect to said metering valve;

microprocessor means for computing a motion command signal as a function of a desired mass flow rate and said measured at least one flow condition; and said microprocessor means emitting said motion command signal to said adjustment means, and said adjustment means incrementally adjusting said position of said flow control element as a function of said motion command signal.

4. A metering valve according to claim 3, wherein said measurement means comprise a hot wire anemometer positioned within said fluid downstream of said metering valve.

5. A metering valve according to claim 1, wherein said adjustment means comprise a motor with an integral encoder operatively coupled to said flow control element.

6. A metering valve according to claim 1, wherein:

said flow control element comprises a scroll plate, said scroll plate is rotatably mounted with respect to said valve housing;

at least a metering section of said scroll plate has a continuously decreasing radius with respect to an axis of rotation of said scroll plate along a periphery of said scroll plate; and said flow port converges at a continuously decreasing rate, in a radial direction away from said axis of rotation, for at least a portion of a radial length of said flow port.

7. A metering valve according to claim 6, wherein said adjustment means incrementally adjusts an angular position of said scroll plate with respect to said valve housing thereby varying said area of said flow port.

8. A metering valve according to claim 6, further comprising:

measurement means for measuring at least one of an inlet pressure, an outlet pressure, and an inlet temperature of said fluid flowing through said metering valve; and microprocessor means for computing a motion command signal as a function of a desired mass flow rate, said measured inlet pressure, said measured outlet pressure, and said measured inlet temperature, and said microprocessor means emitting said motion command signal to said adjustment means, and said adjustment means incrementally adjusting said position of said flow control element as a function of said motion command signal.

9. A metering valve according to claim 8, wherein said adjustment means comprise a motor having an integral encoder operatively coupled to said scroll plate.

10. A metering valve according to claim 6, wherein said metering section extends over an approximately 300° arc segment of said periphery.

11. A metering valve comprising:

a valve housing, said valve housing forming a flow port;

a flow control element adjustably mounted to move with respect to said valve housing;

adjustment means for incrementally adjusting a position of said flow control element and varying a flow area of said flow port; and flow control means for maintaining an exponentially varying mass flow rate of fluid flowing through the metering valve while linearly varying a position of said flow control element.

12. A method for metering a fluid comprising the steps of:

incrementally adjusting a position of a flow control element of a metering valve and varying an area of a flow port; and maintaining at each fixed incremental position of said flow control element an approximately constant percentage of set point variation in mass flow rate of a fluid flowing through said flow port throughout a metering range of said metering valve, said constant percentage of set point variation being a difference between an incremented mass flow rate at an incremented position of said flow control element and a set mass flow rate at a set point previous to said incremented position, divided by said set mass flow rate.

13. A method according to claim 12 further comprising:

measuring an inlet pressure, an outlet pressure, and an inlet temperature of said fluid flowing through said metering valve;

computing a motion command signal as a function of a desired mass flow rate, said measured inlet pressure, said measured outlet pressure, and said measured inlet temperature; and emitting said motion command signal to a controller for controlling said flow control element according to said motion command signal to achieve said desired mass flow rate.

14. A method according to claim 12 further comprising:

measuring at least one flow condition of said fluid flowing downstream of said metering valve;

computing a motion command signal as a function of a desired mass flow rate and said measured at least one flow condition; and emitting said motion command signal to a controller for controlling said flow control element according to said motion command signal to achieve said desired mass flow rate.

15. A method according to claim 14, wherein said at least one flow condition is measured by passing said fluid flowing downstream of said metering valve across a hot wire anemometer.

16. A method according to claim 12 wherein said motion command signal is computed as a function of a speed and a load of an engine.

17. A method for metering a fluid comprising the steps of:

incrementally adjusting a position of a flow control element of a metering valve and varying an area of a flow port; and maintaining an exponentially varying mass flow rate of fluid flowing through the metering valve while linearly varying said position of said flow control element.

* * * * *